US 7,651,982 B2

(12) United States Patent
Cassidy et al.

(10) Patent No.: US 7,651,982 B2
(45) Date of Patent: Jan. 26, 2010

(54) METHODS AND AQUEOUS ACID SOLUTIONS FOR ACIDIZING WELLS CONTAINING SLUDGING AND EMULSIFYING OIL

(75) Inventors: Juanita M. Cassidy, Duncan, OK (US); Chad E. Kiser, Comanche, OK (US); Jim L. Lane, Duncan, OK (US)

(73) Assignee: Halliburton Energy Services, Inc., Duncan, OK (US)

( * ) Notice: Subject to any disclaimer, the term of this patent is extended or adjusted under 35 U.S.C. 154(b) by 408 days.

(21) Appl. No.: 10/923,172

(22) Filed: Aug. 21, 2004

(65) Prior Publication Data

US 2006/0040831 A1   Feb. 23, 2006

(51) Int. Cl.
*C09K 8/60* (2006.01)
*C09K 8/74* (2006.01)
*E21B 21/00* (2006.01)

(52) U.S. Cl. .............. 507/240; 166/270; 166/270.1; 166/271; 166/275; 166/305.1; 166/307; 507/203; 507/239; 507/242; 507/248; 507/277

(58) Field of Classification Search ............. 507/203, 507/239, 240, 242, 248, 269, 277; 166/270, 166/270.1, 271, 275, 305.1, 307
See application file for complete search history.

(56) References Cited

U.S. PATENT DOCUMENTS

| 3,816,322 | A | * | 6/1974 | Griffin et al. ............. 510/259 |
| 3,932,296 | A | * | 1/1976 | Byth ....................... 507/240 |
| 4,557,949 | A | * | 12/1985 | Kurihara et al. .......... 427/244 |
| 4,737,296 | A | | 4/1988 | Watkins ................ 252/8.553 |
| 5,441,929 | A | * | 8/1995 | Walker .................... 507/260 |
| 5,919,980 | A | * | 7/1999 | Dahanayake et al. ...... 564/292 |
| 6,056,896 | A | | 5/2000 | Brezinski ................. 252/394 |
| 6,180,057 | B1 | * | 1/2001 | Taylor et al. ............... 422/16 |
| 2003/0064898 | A1 | | 4/2003 | Brezinski ................. 507/200 |

OTHER PUBLICATIONS

Search Report and Written Opinion No. PCT/GB2005/002978, Jul. 29, 2005.

* cited by examiner

*Primary Examiner*—Timothy J. Kugel
(74) *Attorney, Agent, or Firm*—Robert A. Kent; Baker Botts LLP

(57) ABSTRACT

Methods and aqueous acid solutions for acidizing wells containing sludging and emulsifying oil are disclosed. An aqueous acid solution of the invention comprises water, hydrochloric acid, a cationic hydrochloric acid corrosion inhibitor and a conjugate ion pair of a cationic amine oxide surfactant and an anionic surfactant that does not react with the cationic hydrochloric acid corrosion inhibitor.

19 Claims, No Drawings

METHODS AND AQUEOUS ACID SOLUTIONS FOR ACIDIZING WELLS CONTAINING SLUDGING AND EMULSIFYING OIL

BACKGROUND OF THE INVENTION

1. Field of the Invention

The present invention relates generally to methods and aqueous acid solutions for acidizing wells.

2. Description of the Prior Art

Subterranean oil containing formations penetrated by well bores are often treated with aqueous acids to stimulate the production of oil therefrom. One such treatment generally referred to as "acidizing" involves the introduction of an aqueous acid solution, usually an aqueous hydrochloric acid solution, into a subterranean formation under pressure so that the acid solution flows through the pore spaces of the formation. The acid reacts with the acid soluble materials contained in the formation thereby increasing the size of the pore spaces and increasing the permeability of the formation. Another production stimulation treatment known as "fracture-acidizing" involves the formation of one or more fractures in the formation and the introduction of an aqueous acid solution into the fractures to etch the fracture faces whereby channels are formed therein when the fractures close. The acid also enlarges the pore spaces in the fracture faces and in the formation.

Acidizing and fracture-acidizing solutions typically contain from about 15% to about 28% hydrochloric acid which causes corrosion of metal surfaces in pumps, tubular goods and equipment used to introduce the aqueous acid solutions into the subterranean formations to be treated. As a result, metal corrosion inhibiting additives have been developed and included in the aqueous acid solutions.

In wells that contain acid sensitive oils such as asphaltenic oils, sludges and water-in-oil emulsions are produced when the oils are contacted with aqueous acid solutions. To combat this problem, anti-sludging/de-emulsifying agents have heretofore been utilized in the aqueous hydrochloric acid solutions.

The most commonly used anti-sludging/de-emulsifying agents include the anionic surfactant dodecylbenzenesulfonic acid. However, the anionic nature of dodecylbenzenesulfonic acid brings about incompatibilities with the cationic hydrochloric acid corrosion inhibitors. The cationic hydrochloric acid corrosion inhibitors are generally included in aqueous acid solutions utilized in wells penetrating subterranean zones having high temperatures, e.g., 250° F. and higher. However, a problem that has been encountered with the use of the high temperature performing cationic corrosion inhibitors is that the quaternary ammonium chloride ions in the corrosion inhibitors react with the dodecylbenzenesulfonic acid in the anti-sludging/de-emulsifying agent resulting in precipitation and loss of acidizing performance. As a result, hydrochloric acid stimulation procedures in wells containing sludging and emulsifying oils is limited to temperatures in which non-cationic corrosion inhibitors can be used, i.e., to temperatures less than about 250° F. to thereby avoid precipitation, etc. Another disadvantage is that when hydrochloric acid cannot be used due to high temperatures and sludging and emulsifying oils, less effective organic acids must be employed.

Thus, there is a need for improved methods and aqueous acid solutions for acidizing subterranean zones containing sludging and emulsifying oils which do not include anionic anti-sludging/de-emulsifying agents that react with cationic corrosion inhibitors at high temperatures.

SUMMARY OF THE INVENTION

The present invention provides improved methods and aqueous acid solutions for acidizing wells containing sludging and emulsifying oils which meet the needs described above and overcome the deficiencies of the prior art.

A method of this invention for acidizing a subterranean formation containing oil that forms sludge and emulsions when contacted with an aqueous acid solution comprises the following steps. An aqueous hydrochloric acid solution is prepared or provided comprising water, hydrochloric acid, a cationic hydrochloric acid corrosion inhibitor and a conjugate ion pair of a cationic amine oxide surfactant and an anionic surfactant that does not react with the cationic corrosion inhibitor and reduces the formation of sludge and emulsions resulting from the acid solution contacting the formation oil. Thereafter, the aqueous hydrochloric acid solution is introduced into the subterranean formation.

Another method of the present invention for acidizing a subterranean formation containing oil that forms sludge and emulsions when contacted with an aqueous hydrochloric acid solution at temperatures above about 250° F. comprises the following steps. An aqueous hydrochloric acid solution is prepared or provided comprising water, hydrochloric acid, a cationic hydrochloric acid corrosion inhibitor comprising an alkylquinoline quaternary ammonium compound, or quinoline which is protonated in the acidic environment, and a conjugate ion pair of a dimethylcocoalkylamine oxide surfactant and a dodecyl sodium sulfate surfactant that does not react with the cationic corrosion inhibitor and reduces the formation of sludge and emulsions resulting from the acid solution contacting the formation oil. The aqueous hydrochloric acid solution is pumped into the subterranean formation and the spent aqueous hydrochloric acid solution is recovered from the subterranean formation.

An aqueous acid solution of this invention for acidizing subterranean formations containing sludging and emulsifying oil comprises water, hydrochloric acid, a cationic hydrochloric acid corrosion inhibitor and a conjugate ion pair of a cationic amine oxide surfactant and an anionic surfactant that does not react with the cationic hydrochloric acid corrosion inhibitor and reduces the formation of sludge or emulsions.

The objects, features and advantages of the present invention will be readily apparent to those skilled in the art upon a reading of the description of preferred embodiments which follows.

DESCRIPTION OF PREFERRED EMBODIMENTS

A method of this invention for acidizing a subterranean formation containing oil that forms sludge and emulsions when contacted with an aqueous hydrochloric acid solution basically comprises the steps of preparing or providing an aqueous hydrochloric acid solution comprising water, hydrochloric acid, a cationic hydrochloric acid corrosion inhibitor and a conjugate ion pair of a cationic amine oxide surfactant and an anionic surfactant that does not react with the corrosion inhibitor and reduces the formation of sludge or emulsions resulting from the acid solution contacting the formation oil. Thereafter the aqueous hydrochloric acid solution is introduced into the subterranean formation to be acidized.

The hydrochloric acid is generally present in the hydrochloric acid solution in an amount in the range of from about 5% to about 32% by weight of the water therein, most generally in an amount of about 15% to 28% by weight of the water.

The cationic hydrochloric acid corrosion inhibitor in the hydrochloric acid solution includes, but is not limited to, a nitrogen species such as a quaternary ammonium compound or one or more amines which are protonated in acidic environments. The quaternary ammonium compounds that can be utilized in the corrosion inhibitor include, but are not limited to, alkylpyridine-N-methyl chloride, alkylpyridine-N-benzyl chloride, alkylquinoline-N-benzyl chloride, alkylisoquinoline quaternary compounds, quinoline quaternary compounds, and chloromethylnaphthalene quaternary compounds such as chloromethylnaphthyl quinoline chloride. Of these, an alkylquinoline quaternary ammonium compound is preferred.

The one or more amines that can be utilized include, but are not limited to, monoalkylamines, dialkylamines, trialkylamines, ethylenediamine, diethylenetriamine, pyridine, quinoline, and isoquinoline. Of these, quinoline is preferred.

A preferred cationic hydrochloric acid corrosion inhibitor for use in accordance with the present invention comprises an alkylquinoline quaternary ammonium compound present in an amount in the range of from about 5% to about 45% by weight, an alkenyl carbonyl present in an amount in the range of from 10% to about 30% by weight and an alcohol solvent present in the range of from about 20% to about 60% by weight.

The cationic hydrochloric acid corrosion inhibitor used is generally present in the aqueous hydrochloric acid solution in an amount in the range of from about 0.01% to about 5% by weight of the water therein.

The conjugate ion pair comprises a cationic amine oxide surfactant and an anionic surfactant. The cationic amine oxide surfactant can have the following formula:

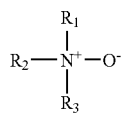

wherein $R_1$, $R_2$ and $R_3$ are alkyl, hydroxyalkyl, hydroxyalkyl ether, oxyalkyl, amidoalkyl, alkenyl, aryl or arylalkenyl radicals having non-interfering substituents and having sufficient lengths to provide appropriate surfactancy in the aqueous hydrochloric acid solution. Examples of the preferred cationic amine oxide surfactants that can be utilized in the conjugate ion pair include, but are not limited to, dimethylcocoalkylamine oxide, myristyldimethylamine oxide, cocoamidopropyldimethylamine oxide, cetyldimethylamine oxide, stearyldimethylamine oxide, bis(2-hydroxy-ethyl)tallowalkylamine oxides. Of these, dimethylcocoalkylamine oxide is most preferred.

The anionic surfactant in the conjugate ion pair is an anionic surfactant having a sufficiently long hydrocarbon tail and polar head group to function as an anti-sludging/de-emulsifying agent. Examples of suitable such anionic surfactants include, but are not limited to, sulfonic acids, sulfonates, and sulfates. Examples of the preferred anionic surfactants that can be utilized in the conjugate ion pair include, but are not limited to, dodecyl sodium sulfate, dodecyl ammonium sulfate, sodium laureth sulfate, ammonium laureth sulfate, sodium alpha-sulfo methyl laurate, disodium alpha-sulfo laurate, alpha-sulfo methyl cocoate, disodium alpha-sulfo cocoate, dodecylbenzene sulfonic acid and dodecylbenzene sulfonate salts. Of these, dodecyl sodium sulfate is preferred.

A particularly suitable conjugate ion pair that can be utilized in accordance with the present invention comprises a dimethylcocoalkylamine oxide cationic surfactant and a dodecyl sodium sulfate anionic surfactant.

The conjugate ion pair is present in the aqueous hydrochloric acid solution in an amount in the range of from about 0.1% to about 5% by volume of the water therein.

Another method of this invention for acidizing a subterranean formation containing oil that forms sludge and emulsions when contacted with an aqueous hydrochloric acid solution at temperatures above about 250° F. comprises the following steps. An aqueous hydrochloric acid solution is prepared or provided comprising water, a hydrochloric acid, a cationic hydrochloric acid corrosion inhibitor comprising an alkylquinoline quaternary ammonium compound, or quinoline which is protonated in the acidic environment, a conjugate ion pair of a dimethylcocoalkylamine oxide surfactant and a dodecyl sodium sulfate surfactant that does not react with the cationic corrosion inhibitor and reduces the formation of sludge and emulsions resulting from the acid solution contacting the formation oil. The aqueous hydrochloric acid solution is pumped into the subterranean formation and the spent aqueous hydrochloric acid solution is recovered from the subterranean formation. The various components in the method described above and their amounts are the same as those described above.

An aqueous acid solution for acidizing subterranean formations containing sludging and emulsifying oil is also provided by the present invention. The aqueous acid solution comprises water, hydrochloric acid, a cationic hydrochloric acid corrosion inhibitor and a conjugate ion pair of a cationic amine oxide surfactant and an anionic surfactant. The conjugate ion pair does not react with the cationic hydrochloric acid corrosion inhibitor and reduces the formation of sludge or emulsions.

The components and their amounts in the aqueous acid solution are the same as those described above.

A preferred method of this invention for acidizing a subterranean formation containing oil that forms sludge and emulsions when contacted with an aqueous hydrochloric acid solution comprises the steps of: preparing or providing an aqueous hydrochloric acid solution comprising water, hydrochloric acid, a cationic hydrochloric acid corrosion inhibitor and a conjugate ion pair of a cationic amine oxide surfactant and an anionic surfactant that does not react with the corrosion inhibitor and reduces the formation of sludge or emulsions resulting from the acid solution contacting the formation oil; and introducing the aqueous hydrochloric acid solution into the subterranean formation.

Another preferred method of acidizing a subterranean formation containing oil that forms sludges and emulsions when contacted with an aqueous hydrochloric acid solution at temperatures above about 250° F. comprises the steps of: preparing or providing an aqueous hydrochloric acid solution comprising water, hydrochloric acid, a cationic hydrochloric acid corrosion inhibitor comprising an alkylquinoline quaternary ammonium compound, or a quinoline which is protonated in the acidic environment, and a conjugate ion pair of a dimethylcocoalkylamine oxide surfactant and a dodecyl sodium sulfate surfactant that does not react with the corrosion inhibitor and reduces the formation of sludge or emulsions resulting from the acid solution contacting the formation oil; pumping the aqueous hydrochloric acid solution into the subterranean formation; and recovering the spent aqueous hydrochloric acid solution from the subterranean formation.

A preferred aqueous acid solution of this invention for acidizing subterranean formations containing sludging and emulsifying oil comprises water, hydrochloric acid, a cationic hydrochloric acid corrosion inhibitor and a conjugate ion pair of a cationic amine oxide surfactant and an anionic surfactant that does not react with the cationic hydrochloric acid corrosion inhibitor and reduces the formation of sludge or emulsions.

In order to further illustrate the methods and aqueous acid solutions of this invention, the following examples are given.

Example 1

A conjugate ion pair of a cationic dimethylcocoalkylamine oxide surfactant and an anionic dodecyl sodium sulfate surfactant was prepared. An aqueous hydrochloric acid solution comprising water, 7% by weight hydrochloric acid, 0.68% stannous chloride dehydrate based reducing agent, 4% formic acid and 3000 parts per million ferric ion was also prepared. Emulsion tests were performed by shaking equal volumes of the aqueous hydrochloric acid solutions with and without the conjugate ion pair and a sludging and emulsifying oil together for 30 seconds, placing the acid oil mixture in a 200° F. water bath and thereafter monitoring the time for the two phases to break apart. Development of sludge was determined by filtering the break test fluids through a 100 mesh filter. Solids were washed with hot water, and then kerosene prior to classification of the amount of solids as none, trace, small, moderate or large. In a first series of tests, an additional surfactant was employed, i.e., naphthenic acid ethoxylated with 18-20 moles of ethylene oxide, simulating the de-emulsifying and anti-sludging properties of ethoxylated alkyl alcohols in inhibitor blends. In another series of tests, a benzylnaphthylquinoline chloride was added simulating a cationic corrosion inhibitor. The results of these tests are set forth in Table I below.

prior to their emersion in 100 mL of the acid blend described above. Hastelloy autoclaves containing the test fluids with N-80 specimens were pressurized and then heated to test temperature for the contact time indicated. Following the test, the difference in weight of the specimen was recorded and converted to pounds per square foot. Inhibitor A is a blend of alkylquinoline quaternary ammonium compound, alkenyl carbonyl, solvents and surfactants. AS-7 and AS-9 are the trademarked designations of dodecylbenzene sulfonic acid based anti-sludging agents sold by Halliburton Energy Services of Duncan, Okla.

TABLE II

Weight Loss Corrosion Tests Utilizing Different Anti-Sludging Agents In an Aqueous Solution of 7% HCl/4% Formic Acid at 325° F.

| Inhibitor | AS-Agent | Corrosion Loss ($lb/ft^2$) |
|---|---|---|
| 2% (vol) Inhibitor A | 1% (vol) dimethylcocoalkyl amine oxide*/0.46% (wt) dodecyl sodium sulfate | 0.034 |
| 2% (vol) Inhibitor A | 1% (vol) AS-7 | 0.293 |
| 2% (vol) Inhibitor A | 1% (vol) AS-9 | 0.415 |

*Approximately 40% active blend.

As shown in Table II, the corrosion losses were dramatically improved with the use of the conjugate ion pair versus other prior art anti-sludging agents.

Thus, the present invention is well adapted to carry out the objects and attain the ends and advantages mentioned as well as those inherent therein. While numerous changes may be made by those skilled in the art, such changes are encompassed within the spirit of this invention as defined by the appended claims.

TABLE I

Sludge and Emulsion Tests With and Without a Conjugate Ion Pair of an Amine Oxide and an Anionic Surfactant

| Conjugate Ion Pair | Cationic Corrosion Inhibitor | Sludging/Emulsifying Oil | 1 min | 3 min | 5 min | 10 min | Sludge |
|---|---|---|---|---|---|---|---|
| Yes | 0.26 vol % Surfactant[1] | Puerta Ciba | 0 | 100 | 100 | 100 | none |
| No | 0.26 vol % Surfactant[1] | Puerta Ciba | 0 | 0 | 0 | 0 | trace |
| Yes | 0.26 vol % Surfactant[1] | Pozo Jujo | 0 | 60 | 80 | 100 | small |
| No | 0.26 vol % Surfactant[1] | Pozo Jujo | 0 | 0 | 20 | 100 | moderate |
| Yes | 0.26 vol % Surfactant[1] | Tecominoacán | 0 | 80 | 100 | 100 | small |
| No | 0.26 vol % Surfactant[1] | Tecominoacán | 20 | 60 | 60 | 100 | small |
| Yes | 0.32 vol % Inhibitor[2] | Puerta Ciba | 0 | 0 | 0 | 0 | small |
| No | 0.32 vol % Inhibitor[2] | Puerta Ciba | 0 | 0 | 0 | 0 | small |
| Yes | 0.32 vol % Inhibitor[2] | Pozo Jujo | 0 | 0 | 0 | 100 | small |
| No | 0.32 vol % Inhibitor[2] | Pozo Jujo | 0 | 0 | 0 | 0 | moderate |
| Yes | 0.32 vol % Inhibitor[2] | Tecominoacán | 0 | 0 | 0 | 0 | small |
| No | 0.32 vol % Inhibitor[2] | Tecominoacán | 0 | 0 | 40 | 80 | moderate |

[1]18-20 mol ethoxylated naphthenic acid;
[2]benzylnaphthylquinoline chloride

The results of the emulsion tests show much improved emulsion break times when the aqueous acid solution included the conjugate ion pair as compared to when the hydrochloric acid solution did not include the conjugate ion pair. As shown in Table I, the sludge was either unchanged in amount or significantly decreased when the conjugate ion pair was included.

The corrosion loss results are presented in Table II below. The corrosion loss data were generated for N-80 steel using the weight loss method. Coupons were cleaned and weighed

What is claimed is:

1. A method of acidizing a subterranean formation comprising:
   providing a conjugate ion pair of a cationic amine oxide surfactant and an anionic surfactant, wherein:
   the cationic amine oxide surfactant has the following formula:

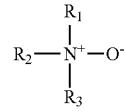

wherein $R_1$, $R_2$ and $R_3$ are alkyl, hydroxyalkyl, hydroxyalkyl ether, oxyalkyl, amidoalkyl, alkenyl, aryl or arylalkenyl radicals having non-interfering substituents and having sufficient lengths to provide appropriate surfactancy in an aqueous hydrochloric acid solution and the anionic surfactant comprises at least one anionic surfactant selected from the group consisting of: dodecyl sodium sulfate, dodecyl ammonium sulfate, sodium laureth sulfate, ammonium laureth sulfate, sodium alpha-sulfo methyl laurate, disodium alpha-sulfo laurate, alpha-sulfo methyl cocoate, disodium alpha-sulfa cocoate, dodecylbenzene sulfonic cid, and dodecylbenzene sulfonate salt;

preparing the aqueous hydrochloric acid solution comprising water, hydrochloric acid, a cationic hydrochloric acid corrosion inhibitor, and the conjugate ion pair, wherein the conjugate ion pair does not react with the corrosion; and introducing the aqueous hydrochloric acid solution into a subterranean formation that comprises formation oil, wherein the conjugate ion pair reduces the formation of sludge or emulsions resulting from the aqueous hydrochloric acid solution contacting the formation oil.

2. The method of claim 1 wherein the cationic hydrochloric acid corrosion inhibitor comprises a nitrogen species which is protonated in acidic environments.

3. The method of claim 2 wherein the cationic hydrochloric acid corrosion inhibitor comprises alkylpyridine-N-methyl chloride, alkylpyridine-N-benzyl chloride, alkylquinoline-N-benzyl chloride, an alkylisoquinoline quaternary compound, a quinoline quaternary compound, or a chloromethylnaphthalene quaternary compound.

4. The method of claim 2 wherein the cationic hydrochloric acid corrosion inhibitor comprises a monoalkylamine, a dialkylamine, a trialkylamine, ethylenediamine, diethylenetriamine, pyridine, quinoline, or isoquinoline.

5. The method of claim 1 wherein the hydrochloric acid is present in the aqueous hydrochloric acid solution in an amount in the range of from about 5% to about 32% by weight of the water therein.

6. The method of claim 1 wherein the cationic hydrochloric acid corrosion inhibitor comprises an alkylquinoline quaternary ammonium compound present in an amount in the range of from about 5% to about 10% by weight of the cationic hydrochloric acid corrosion inhibitor, an alkenyl carbonyl present in an amount in the range of from about 10% to about 30% by weight of the cationic hydrochloric acid corrosion inhibitor, and an alcohol solvent present in the range of from about 20% to about 60% by weight of the cationic hydrochloric acid corrosion inhibitor.

7. The method of claim 1 wherein the cationic hydrochloric acid corrosion inhibitor is present in the aqueous hydrochloric acid solution in an amount in the range of from about 0.01% to about 5% by weight of the water therein.

8. The method of claim 1 wherein the cationic amine oxide surfactant comprises dimethylcocoalkylamine oxide, myristamine oxide, or cocoamidopropyldimethylamine oxide.

9. The method of claim 1 wherein the anionic surfactant comprises dodecyl sodium sulfate, dodecyl ammonium sulfate, dodecylbenzenesulfonic acid, or disodium alpha-sulfo laurate.

10. The method of claim 1 wherein the cationic amine oxide surfactant is dimethylcocoalkylamine oxide and the anionic surfactant is dodecyl sodium sulfate.

11. The method of claim 1 wherein the conjugate ion pair is present in the aqueous hydrochloric acid solution in an amount in the range of from about 0.1% to about 5% by volume of the water therein.

12. A method of acidizing a subterranean formation comprising:

providing a conjugate ion pair of a dimethylcocoalkylamine oxide surfactant and a dodecyl sodium sulfate surfactant;

preparing an aqueous hydrochloric acid solution comprising water, hydrochloric acid, a cationic hydrochloric acid corrosion inhibitor comprising a quaternary ammonium compounds and the conjugate ion pair, wherein the conjugate ion pair does not react with the corrosion;

pumping the aqueous hydrochloric acid solution into the subterranean formation that comprises formation oil, wherein the conjugate ion pair reduces the formation of sludge or emulsions resulting from the aqueous hydrochloric acid solution contacting the formation oil at temperatures above about 250° F.; and recovering the aqueous hydrochloric acid solution from the subterranean formation.

13. The method of claim 12 wherein the hydrochloric acid is present in the aqueous hydrochloric acid solution in an amount in the range of from about 5% to about 32% by weight of the water therein.

14. The method of claim 12 wherein the quaternary ammonium compound comprises an alkylquinoline quaternary compound.

15. The method of claim 12 wherein the quaternary ammonium compound comprises alkylpyridine-N-methyl chloride, alkylpyridine-N-benzyl chloride, alkylquinoline-N-benzyl chloride, a quinoline quaternary compound, or a chloromethylnaphthalene quaternary compound.

16. The method of claim 12 wherein the quaternary ammonium compound comprises a protonated quinoline.

17. The method of claim 12 wherein the cationic hydrochloric acid corrosion inhibitor comprises an alkylquinoline quaternary ammonium compound present in an amount in the range of from about 5% to about 10% by weight of the cationic hydrochloric acid corrosion inhibitor, an alkenyl carbonyl present in an amount in the range of from about 10% to about 30% by weight of the cationic hydrochloric acid corrosion inhibitor, and an alcohol solvent present in the range of from about 20% to about 60% by weight of the cationic hydrochloric acid corrosion inhibitor.

18. The method of claim 12 wherein the cationic hydrochloric acid corrosion inhibitor is present in the aqueous hydrochloric acid solution in an amount in the range of from about 0.01% to about 5% by weight of the water therein.

19. The method of claim 12 wherein the conjugate ion pair is present in the aqueous hydrochloric acid solution in an amount in the range of from about 0.1% to about 5% by volume of the water therein.

* * * * *

UNITED STATES PATENT AND TRADEMARK OFFICE
CERTIFICATE OF CORRECTION

PATENT NO. : 7,651,982 B2
APPLICATION NO. : 10/923172
DATED : January 26, 2010
INVENTOR(S) : Cassidy et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 554 days.

Signed and Sealed this

Twenty-third Day of November, 2010

David J. Kappos
*Director of the United States Patent and Trademark Office*